United States Patent [19]

Stone

[11] Patent Number: 5,598,410
[45] Date of Patent: *Jan. 28, 1997

[54] METHOD AND APPARATUS FOR ACCELERATED PACKET PROCESSING

[75] Inventor: Geoffrey C. Stone, Minneapolis, Minn.

[73] Assignee: Storage Technology Corporation, Louisville, Colo.

[*] Notice: The term of this patent shall not extend beyond the expiration date of Pat. No. 5,546,390.

[21] Appl. No.: 366,225

[22] Filed: Dec. 29, 1994

[51] Int. Cl.⁶ .......................... H04L 12/56; G06F 13/00
[52] U.S. Cl. .......................... 370/469; 395/800; 395/670
[58] Field of Search .................. 370/58.1, 58.2, 370/58.3, 60, 60.1, 61, 79, 82, 83, 85.13, 85.14, 94.1, 94.2, 94.3, 99; 395/200, 325, 375, 650, 800

[56] References Cited

U.S. PATENT DOCUMENTS

| | | | |
|---|---|---|---|
| 5,134,610 | 7/1992 | Shand et al. | 370/60 |
| 5,200,953 | 4/1993 | Spatafore et al. | 370/85.12 |
| 5,249,292 | 9/1993 | Chiappa | 395/650 |
| 5,278,834 | 1/1994 | Mazzola | 370/94.1 |
| 5,280,476 | 1/1994 | Kojima et al. | 370/60.1 |
| 5,307,343 | 4/1994 | Bostica et al. | 370/60 |
| 5,414,702 | 5/1995 | Kudoh | 370/60 |
| 5,414,707 | 5/1995 | Johnston et al. | 370/79 |
| 5,430,709 | 7/1995 | Galloway | 370/13 |

*Primary Examiner*—Alpus H. Hsu
*Attorney, Agent, or Firm*—Timothy R. Schulte

[57] ABSTRACT

A method and apparatus are provided to transfer protocol data units within a communication network. This transferring is accomplished with a protocol data unit processor that is operated in the communication network. The processor includes a preprocessor which establishes subsequent processing requirements of a particular protocol data unit received from the communication network to generate at least one associated directive for the particular protocol data unit. Subsequently, a synchronizing mechanism synchronizes the particular protocol data unit with the at least one associated directive to generate a synchronized protocol data unit. A restructuring device restructures the synchronized protocol data unit in accordance with the at least one associated directive for the protocol data unit to generate a restructured protocol data unit. In addition, a method of operating the protocol data unit processor in a heterogeneous communication network is provided.

31 Claims, 7 Drawing Sheets

METHOD AND APPARATUS FOR ACCELERATED PACKET PROCESSING

RELATED INVENTIONS

The present invention is related to:

Co-pending U.S. patent application Ser. No. 08/366,221, filed on Dec. 23, 1994, which is entitled "Method And Apparatus For Accelerated Packet Forwarding" by Mark Bakke et al., Co-pending U.S. patent application Ser. No. 08/366,221, filed on Dec. 23, 1994, which is entitled "Method And Apparatus For Radix Decision Packet Processing" by Geof Stone, Co-pending U.S. patent application Ser. No. 08/366,221, filed on Dec. 23, 1994, which is entitled "Method And Apparatus For Virtual Switching" by Ken Hardwick et al.;

and which were all filed concurrently herewith and assigned to the assignee of the present invention.

FIELD OF THE INVENTION

The present invention relates generally to data communication networks. More particularly, the present invention relates to protocol data unit forwarding systems that direct the flow of protocol data units in the data communication networks.

BACKGROUND OF THE INVENTION

In a data communication network, a forwarding device (e.g., a data packet switch) directs protocol data units (e.g., data packets) from one network node to another. These data packets may include voice, video, or data information as well as any combination thereof.

To better understand how forwarding devices work within a data communication network, an analogy may be helpful. In many respects, data communication networks are similar to postal delivery systems, with pieces of mail, such as letters or packages, being comparable to the data packets which are transferred within a data communication network. In a postal delivery system, the pieces of mail may be input into the postal delivery system in a variety of ways. Once within the postal delivery system, all of the pieces of mail are collected and transported to nearby processing facilities where the pieces of mail are sorted for further processing. Although each piece of mail will have a unique delivery address, most of the pieces of mail are automatically sorted by a shorter zip code or some other type of routing code. Letters without zip codes must be sorted and processed by hand. Some postal delivery systems also have special forms of encoded delivery addresses, such as Post Office box numbers at a Post Office, which are not recognizable by other postal delivery systems such as Federal Express or United Parcel Service. Regardless of which particular postal delivery system the piece of mail is deposited into, once the mail has been sorted by destination it is routed through additional intermediary processing facilities until it arrives at the local indicated by the destination on the piece of mail. At this point, the zip code or routing code is no longer sufficient to deliver the piece of mail to the intended destination and the local delivery office must further decode the destination address in order to deliver the piece of mail to the intended recipient. In addition to processing pieces of mail for routing the mail to the correct destination, the pieces of mail may go on through several other processing steps. For example, if the piece of mail is going out of the country, it must go through a customs operation in each country. If the national postal delivery system is being used to deliver the piece of mail then it must also be transferred from one national postal delivery system to another. In a private postal delivery system however, this transfer step would not be necessary. The pieces of mail may also be monitored or filtered for such things as mail fraud violation or shipment of hazardous materials.

Data packets are manipulated in a data communication network in a manner similar to that by which pieces of mail are delivered in a postal delivery system. Data packets, for example, are generated by many different types of devices and are placed onto a communication network. Typically, the data packets are concentrated into a forwarding device, such as a local bridge or router, and are then directed by destination over one or more media types (e.g., fiber optic) which are connected to destination devices that could be other larger or smaller bridges or routers. These destination devices then deliver the data packet to its terminal end point (i.e., the end user). Along the way the data communication network may perform filtering and monitoring functions with respect to the data packets.

Just like postal delivery systems have experienced ever increasing volumes of mail which must be delivered, the volume of protocol data units being transferred across computer networks continues to increase as experience is being gained with this new form of communication delivery system and as more and more applications, with more and more expansive means are being developed. In addition, quickly changing technology has made the underlying data transmission resources for computer communication networks relatively inexpensive. Fiber optics, for example, offer data transfer rates in the gigabyte per second range.

The capability or through put of a forwarding device and a computer communication network can be measured either by the number of data packets per second or by the number of bits per second which pass through the forwarding device. The former measure is important because in typical network traffic, the bulk of protocol data units or data packets are small and the critical parameter is how many data packets a forwarding device can handle. If network traffic is weighted by packet size, however, the bulk of the data is carried in large packets. In large bulk data transfers, the second measure of how many bits are being transferred is more important regardless of the number of data packets that are handled. This tension between packet transfer rate versus bit transfer rate is a continuing dichotomy in through put measurements of forwarding devices. Regardless of which through put measure is used, there is a need for through put rates that are substantially higher than the through put rates currently available in forwarding devices.

The existing types of forwarding devices which offer the greatest potential to meet the increasing demand on through put rates are packet switches. Several classes of packet switches exist. Each class differs substantially from the other class of devices, but all may be commonly referred to as packet switches or forwarding devices.

A first class of packet switches is that commonly used in digital telephone exchanges. By analogy, these switches can perform the functions only of a mail carrier picking up and delivering mail along a single route. These switches are intended only to transfer packets among the devices in a single station, such as a telephone exchange. The format of the packet in these systems is chosen to make the hardware in the switch as simple as possible; and this usually means that the packets include fields designed for direct use by the hardware. The capabilities of this class of switches (for example, in such areas as congestion control) are very limited in order to keep the hardware simple.

A second class of packet switches is used in smaller or restricted computer networks, such as X.25 networks. By analogy, these switches are equivalent to the Post Office in a single town with no connection to other Post Offices. In some sense, these switches are little different from the first class of packet switches described above, but there is one substantial difference. The format of the packets (that is, the protocols) handled by the second class of packet switches is much more complex. This greater complexity is necessary because the protocols are designed to work in less restricted environments, and because the packet switches must provide a greater range of services. While the formats interpreted by the first class of switches are chosen for easy implementation in hardware, the data packets handled by this second class of switches are generally intended to be interpreted by software (which can easily and economically handle the greater complexity) and provides the inherit benefit of incremental flexibility in the design of the packet switch.

In a third class of packet switches, the packet protocols are intended to be used in very large data networks having many very dissimilar links (such as a mix of very high speed local area networks (LANs) and low speed long distance point to point lines). Examples of such protocols are the United States designed Transmission Control Protocol/Internetwork Program (TCP/IP), and the International Standards Organization's Internetworking Protocol/Connectionless Network Service (IP/CLNS) protocols.

In addition, this third class of switches (commonly referred to as bridge/routers) often must handle multiple protocols simultaneously. This third class of switches is very similar to the mail processing devices used in the modern postal system. Just as there are many countries, there are many data packet protocols used in computer networks. While a single postal system was once thought to be sufficient to handle mail going anywhere in the world, today several competing systems like United Parcel Service, Federal Express, and the U.S. Postal Service exist to handle the special needs of mail going to every country, state, city, town, and street in the world. Similarly, in computer communication systems, the packet switches are more involved in the carrying of data, and must understand some of the details of each protocol to be able to correctly handle data packets which are being conveyed in that protocol. The routers in this third class of packet switches often have to make fairly complex changes to the data packets as they pass through the packet switch.

It is this latter class of packet switches to which the following detailed description primarily relates. It will be appreciated however, that the detailed description of this invention can readily be applied to the first and second class of switches as well. In current conventional packet switch design, a programmed general purpose processor examines each data packet as it arrives over the network interface and then processes that packet. Packet processing requires assignment of the data packet to an outbound network interface for transmission over the next communications link in the data path. While attempts are being made to build higher speed packet switches, based on this architecture of using general purpose processors, the attempts have not been very successful. One approach is to use faster processors, another is to make the software run faster, and a third is to apply multiple processors to the processing task. All of these approaches fail to meet the increasing performance demands for packet switches for the reasons noted below.

The approach which uses faster processors simply keeps pace with processor dependent (future) demands because the traffic which the packet switch will handle will depend upon the speed of the user processors being used to generate the traffic. Those user processors, like the processors in the packet switches, will increase in speed at more or less the same rate. Accordingly, there is no overall increase in the ability of the future packet switch over present packet switches, relative to traffic load. Furthermore, this approach may be impractical as not being cost-effective for widespread use. For example, two high speed machines, distant from each other, must have intermediate switches which are all equally as powerful; deployment on a large scale of such expensive switches is not likely to be practicable.

The approach which increases the execution rate of the software itself by, for example, removing excess instructions or writing the code in assembly language, leads to a limit beyond which an increase in performance cannot be made. The gains which result are typically small (a few percent) and the engineering costs of such distortions in the software are significant in the long term. This type of assembly code optimization restricts the ability to enhance the software as well as port the software to a different processor platform.

The use of multiple processors to avoid the "processor bottleneck" provides some gains but again has limits. Given a code path to forward a data packet, it is not plausible to split that path into more than a few stages. Typically these stages would involve network input, protocol functions, and network output. The basis for this limitation is the overhead incurred to interface the different processors beyond a limited number of task divisions. That is, after a certain point, the increase in interface overhead outweighs the savings obtained from the additional stage. This is particularly true because of the need to tightly integrate the various components; for example, congestion control at the protocol level requires dose coordination with the output device. Also, the interface overhead costs are made more severe by the complication of the interface which is required.

Currently, most bridge/router implementations rely heavily on off-the-shelf microprocessors to perform the packet forwarding functions. The best implementations are able to sustain processing rates approaching 100,000 packets per second (PPS). When dealing with media such as ethernet or current telecommunications lines, this processing rate is more than adequate. When faster media such as Fiber Distributed Data Interchange (FDDI) is used, existing processing rates may still be sufficient as long as there is only one such high packet rate interface present. When multiple high packet rate interfaces are used, 100,000 PPS become inadequate. Current software-based implementations for bridges/routers are simply not capable of media-rate packet forwarding on emerging media such as asynchronous transfer mode (ATM) or Optical Connection-12 Synchronous Optical Network (OC-12 SONET) which can accommodate communication rates up to 6 times the current 100 megabits per second limits to rates of 600 megabits per second.

It should be noted that the ever increasing power of off-the-shelf microprocessors might solve the throughput problem, but this is probably a vain hope. For example a single OC-24 ATM interface can sustain nearly 3 million internetworking protocol (IP) packets per second. This is over 30 times the rates achieved by the current best software techniques. If processing power doubles every year, the wait for sufficient processing power to make a software approach viable would be at least 4–5 years. In addition, the media capabilities will likely continue to increase over such a span of years. Additionally, any such processor will likely require large amounts of the fastest (most expensive) memory available to operate at full speed, resulting in an unacceptably high system cost.

In general then, the multiprocessor approach is not the answer to substantially increasing the throughput of the packet switching network. This has been borne out by several attempts by technically well-regarded groups to build packet switches using this approach. While aggregate throughput over a large number of interfaces can be obtained, this is, in reality, little different than having a large number of small switches. It has thus far proven implausible to substantially speed up a single stream using the multiprocessing approach.

A need still exists for an improved protocol data unit (i.e., frame, cell, or packet) forwarding system which solves the above-identified problems in a manner which can better handle large numbers of input streams, large numbers of output destinations and lines, many different types of communication protocols, and large and small data packets at both high bit throughput rates and high packet throughput rates, while maintaining reasonable costs and complexity.

SUMMARY OF THE INVENTION

The present invention provides a packet processing system with improved throughput performance by means of a method and apparatus for accelerated processing of protocol data units. The present invention addresses the problem of media rate forwarding of packets at gigabyte rates by providing an architecture for the design of bridges/routers that are capable of forwarding packets across different media which can sustain multi-gigabyte rates. This architecture also includes design approaches for implementing key features of a packet-forwarding device operating at these high transfer rates, such as filtering functions. By splitting processing functions, the present invention avoids the "processor bottleneck" inherent in prior art processing device architectures.

In accordance with a first aspect of the invention, a protocol data unit processor is used in a communication network to transfer protocol data units within the communication network. The processor includes a preprocessor which establishes subsequent processing requirements of a particular protocol data unit received from the communication network to generate at least one associated directive for the particular protocol data unit. Subsequently, a synchronizing mechanism synchronizes the particular protocol data unit with the at least one associated directive to generate a synchronized protocol data unit. A restructuring device restructures the synchronized protocol data unit in accordance with the at least one associated directive for the protocol data unit to generate a restructured protocol data unit. In addition, a method of operating the protocol data unit processor in a heterogeneous communication network is provided.

With reference to the postal delivery analogy, the present invention can be likened to a system which both increases the speed at which pieces of mail can be moved through the postal delivery system and provides an ability to handle in a common system pieces of mail entered into a variety of different postal delivery systems. By utilizing the preprocessor and restructuring device of the present invention to split the required protocol data unit processing functions, the present invention is able to significantly increase the through put of the processing device, both in terms of the number of data packets per second and in terms of the number of bits per second which pass through the processing device.

The preprocessor preferably establishes the subsequent processing requirements of the particular protocol data unit by identifying, verifying, and generating at least one associated directive for the particular protocol data unit. In addition, the restructuring device preferably restructures the synchronized protocol data unit by deleting, inserting, and replacing bits in the synchronized protocol data unit in accordance with the at least one associated directive for the protocol data unit. Alternatively, the restructuring device may, in addition to or in place of modifying particular bits, monitor the synchronized protocol data unit by dropping, sending, sending a copy of, and/or auditing the contents of the synchronized protocol data unit in accordance with the at least one associated directives for the protocol data unit.

In order to accelerate the processing of a received protocol data unit, the preprocessor preferably is configured to operate on a first and a second protocol data unit such that the preprocessor can interleave processing of both the first and the second protocol data unit during a single time span. In addition, multiple preprocessors connected in either parallel or series may be used to increase the through put of protocol data units. This use of multiple preprocessors may necessitate the use of a more sophisticated synchronizing mechanism which is able to track and synchronize more that one protocol data unit at a time with the particular associated directives for each protocol data unit. In addition, the preprocessor is configured to establish the at least one associated directive for the particular protocol data unit after having received only a portion (i.e., the first several bits or bytes) of the protocol data unit. The preprocessor may need to buffer into memory or store a portion of the particular protocol data unit as it is received until a large enough portion or the particular portion of the protocol data unit which enables the identification of the particular protocol data unit is received. Similarly, the restructuring device preferably is configured to operate on the synchronized protocol data unit prior to the protocol data unit processing device receiving all of the protocol data unit. This optimization can be taken a step further by outputting a portion of the restructured protocol data unit to a transmitting device prior to receiving all of the protocol data unit. All of these optimizations are particularly important when manipulating large protocol data units which extend over several frames or consist of several smaller parts that are received at various times and/or from various incoming interfaces.

In accordance with a second aspect of the invention, a method of operating a protocol data unit processing device in a heterogeneous communication network is provided to transfer protocol data units within the communication network. This method is performed by device-implemented steps in a series of distinct processing steps that can be implemented in one or more processors. In the first processing step a first and a second protocol data unit are received from the communication network where the first and the second protocol data unit are of different types. The second processing step involves establishing the subsequent processing requirements of the first and the second protocol data unit to generate at least one associated directive for each protocol data unit. Each protocol data unit is synchronized with the at least one associated directive for each protocol data unit to generate a first and a second synchronized protocol data unit, respectively. Then, each synchronized protocol data unit is restructured in accordance with the at least one associated directive for each protocol data unit to generate a first and a second restructured protocol data unit, respectively. Finally, the first and the second restructured protocol data unit are provided to other components in the communication network.

The first and the second protocol data unit may differ from one another in several ways in the heterogeneous communication network including but not limited to being of different physical layer media types, different link layer signaling protocols, and/or different network layer protocols.

These and various other features as well as advantages which characterize the present invention will be apparent upon reading of the following detailed description and review of the associated drawings.

DETAILED DESCRIPTION OF THE PREFERRED EMBODIMENT

Figure 1:
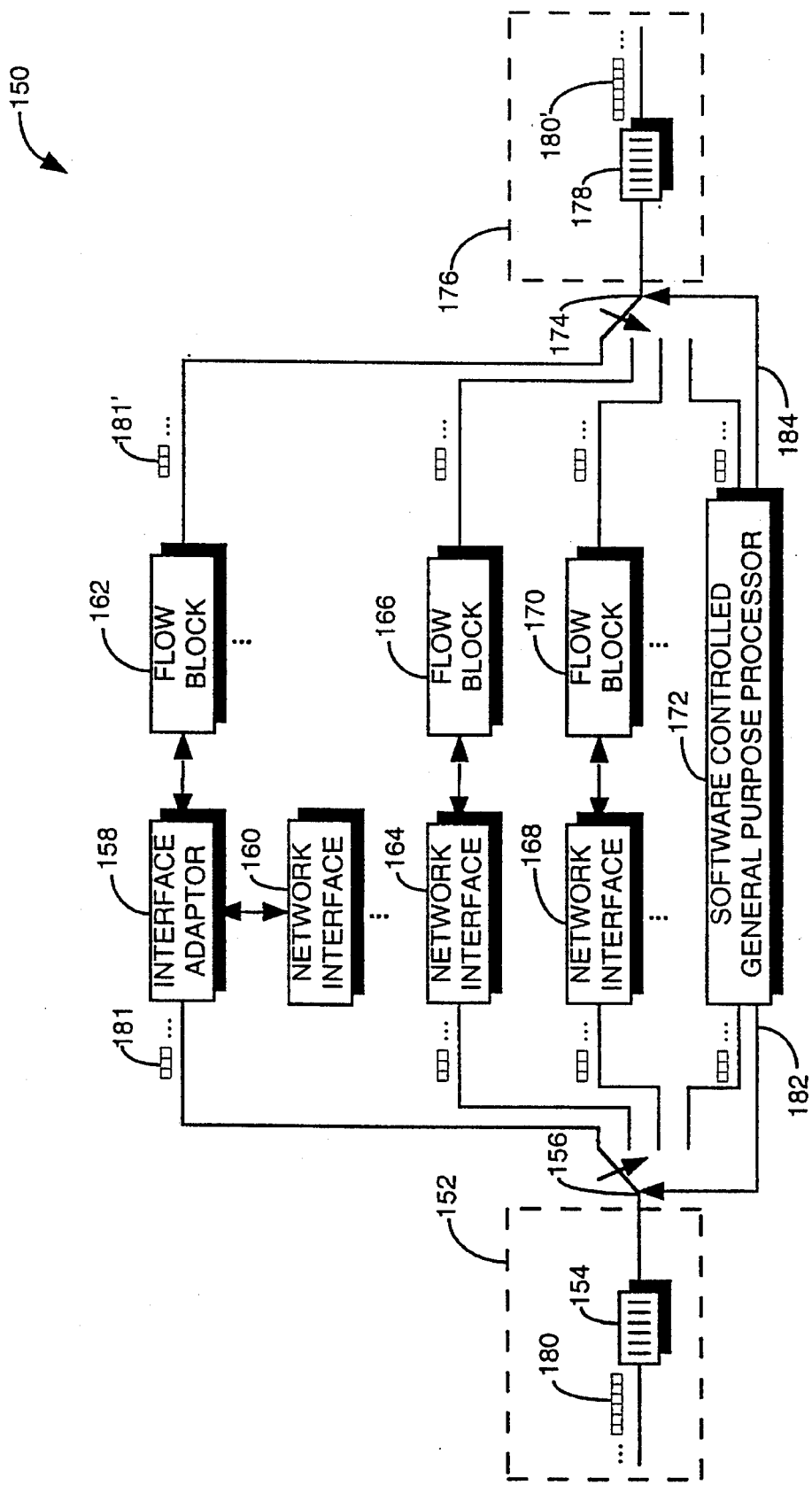
FIG. 1 is a block diagram of a prior art network device.

As will be appreciated by those skilled in the art, communication networks and their operations can be described according to the Open Systems Interconnection (OSI) model which includes seven layers including an application, presentation, session, transport, network, link, and physical layer. The OSI model was developed by the International Organization for Standardization (ISO) and is described in "The Basics Book of OSI and Network Management" by Motorola Codex from Addison-Wesley Publishing Company, Inc., 1993 (First Printing September 1992).

Each layer of the OSI model performs a specific data communications task, a service to and for the layer that precedes it (e.g., the network layer provides a service for the transport layer). The process can be likened to placing a letter in a series of envelopes before it's sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In a data communication transaction, however, each end user is unaware of the envelopes, which perform their functions transparently. For example, an automatic bank teller transaction can be tracked through the multilayer OSI system. One multiple layer system (Open System A) provides an application layer that is an interface to a person attempting a transaction, while the other multiple layer system (Open System B) provides an application layer that interfaces with applications software in a bank's host computer. The corresponding layers in Open Systems A and B are called peer layers and communicate through peer protocols. These peer protocols provide communication support for a user's application, performing transaction related tasks such as debiting an account, dispensing currency, or crediting an account.

Actual data flow between the two open systems (Open System A and Open System B), however, is from top to bottom in one open system (Open System A, the source), across the communications line, and then from bottom to top in the other open system (Open System B, the destination). Each time that user application data passes downward from one layer to the next layer in the same system more processing information is added. When that information is removed and processed by the peer layer in the other system, it causes various tasks (error correction, flow control, etc.) to be performed. The user is unaware of any of this, of course, but in fact that's what's happening while the words, "Please wait, your transaction is being processed" appears on the screen.

The ISO has specifically defined all seven layers, which are summarized below in the order in which the data actually flow as they leave the source:

Layer 7, the application layer, provides for a user application (such as getting money from an automatic bank teller machine) to interface with the OSI application layer. That OSI application layer has a corresponding peer layer in the other open system, the bank's host computer.

Layer 6, the presentation layer, makes sure the user information (a request for $50 in cash to be debited from your checking account) is in a format (i.e., syntax or sequence of ones and zeros) the destination open system can understand.

Layer 5, the session layer, provides synchronization control of data between the open systems (i.e., makes sure the bit configurations that pass through layer 5 at the source are the same as those that pass through layer 5 at the destination).

Layer 4, the transport layer, ensures that an end-to-end connection has been established between the two open systems (i.e., layer 4 at the destination "confirms the request for a connection," so to speak, that it has received from layer 4 at the source).

Layer 3, the network layer, provides routing and relaying of data through the network (among other things, at layer 3 on the outbound side an "address" gets slapped on the "envelope" which is then read by layer 3 at the destination).

Layer 2, the data link layer, includes flow control of data as messages pass down through this layer in one open system and up through the peer layer in the other open system.

Layer 1, the physical interface layer, includes the ways in which data communications equipment is connected mechanically and electrically, and the means by which the data move across those physical connections from layer 1 at the source to layer 1 at the destination.

Shown in FIG. 1, is a prior art network device 150 described in U.S. Pat. No. 5,249,292 issued Sep. 28, 1993 to J. Noel Chiappa. The Chiappa '292 patent describes a data packet switch 150 that operates at OSI layers 1 through 3 which provides a solution to many of the previously-mentioned problems. The Chiappa '292 patent discloses a high speed data packet switching circuit which has a software controlled primary processing unit 172 (i.e., a general purpose processor) and a plurality of network interface units 160, 164, and 168 each connected to an input network 152 (i.e., inbound interface) for receiving incoming data packet streams as well as an output network 176 (i.e., outbound interface) for transmitting outgoing data packet streams for that network. It should be noted that a single input and output network are described by the Chiappa '292 patent.

The input network 152 includes a data byte buffer 154 which temporarily stores portions of incoming data packet streams 180 for the primary processing unit 172 to subsequently analyze or switch to a network interface unit. Similarly, the output network 176 includes a buffer 178 for storing data bytes until the primary processing unit 172 releases modified data packets as an outgoing data packet stream 180' for transmission on the output network. Two types of network interface units are taught by the Chiappa '292 patent. The first type is a general purpose network interface 160 which merely performs the network layer functions and a separate interface adapter 158 which performs data link layer functions such as flow control for data bytes coming from a specific type of physical interface layer device. The second type of network interface unit is a special purpose network interface 164 which combines the functions of the general purpose network interface 160 and interface adapter 158 into a single device.

In addition, a plurality of high speed data stream hardware control circuits 162, 166, and 170 (i.e., flow blocks) are provided for processing data packets in response to instructions for the primary processing unit 172. For example, data packet 181 of one data stream is assigned to flow block 162 and passes through interface adapter 158 while being manipulated by network interface 160. Data packet 181' as modified by flow block 162 is integrated into modified data packet stream 180' prior to transmission on an outbound network.

Also, circuitry 156 and 174 (a multiplexer and a demultiplexer, respectively) are included for interconnecting the primary processing unit 172, the interface units 160, 164, and 168 and the data stream control circuits 162, 166, and 170. The primary processing unit 172 receives, from the input network 152, at least a first one of the data packets 181 of each new data packet stream and assigns, by way of control lines 182 and 184 to circuitry 156 and 158, respectively, that stream to be processed by one of the data stream control circuits 162 without further processing by the primary processing unit 172. When a user desires to handle more data streams simultaneously, more flow blocks and network interfaces are added for the primary processing unit 172 to which incoming data streams are switched. The Chiappa '292 patent thus performs routine, repetitive processing steps on the further packets of the data stream 180' using high speed hardware circuitry 162, while the initial processing and other non-repetitive or special processing of the data packets are performed in software.

Unfortunately, the Chiappa '292 patent as well as the software-based solutions on general purpose microprocessors do not completely solve the "processor bottleneck" problem (i.e., primary processing unit 172 must still analyze each data stream at least once) and as a result a need still exists for an improved protocol data unit (i.e., frame, cell, or packet) forwarding system which solves this problem, as well as others, in a manner which can better handle large numbers of input streams from one or more networks, large numbers of output destinations and lines, and large and small data packets at both high bit throughput rates and high packet throughput rates, while maintaining reasonable costs and complexity.

Figure 2:
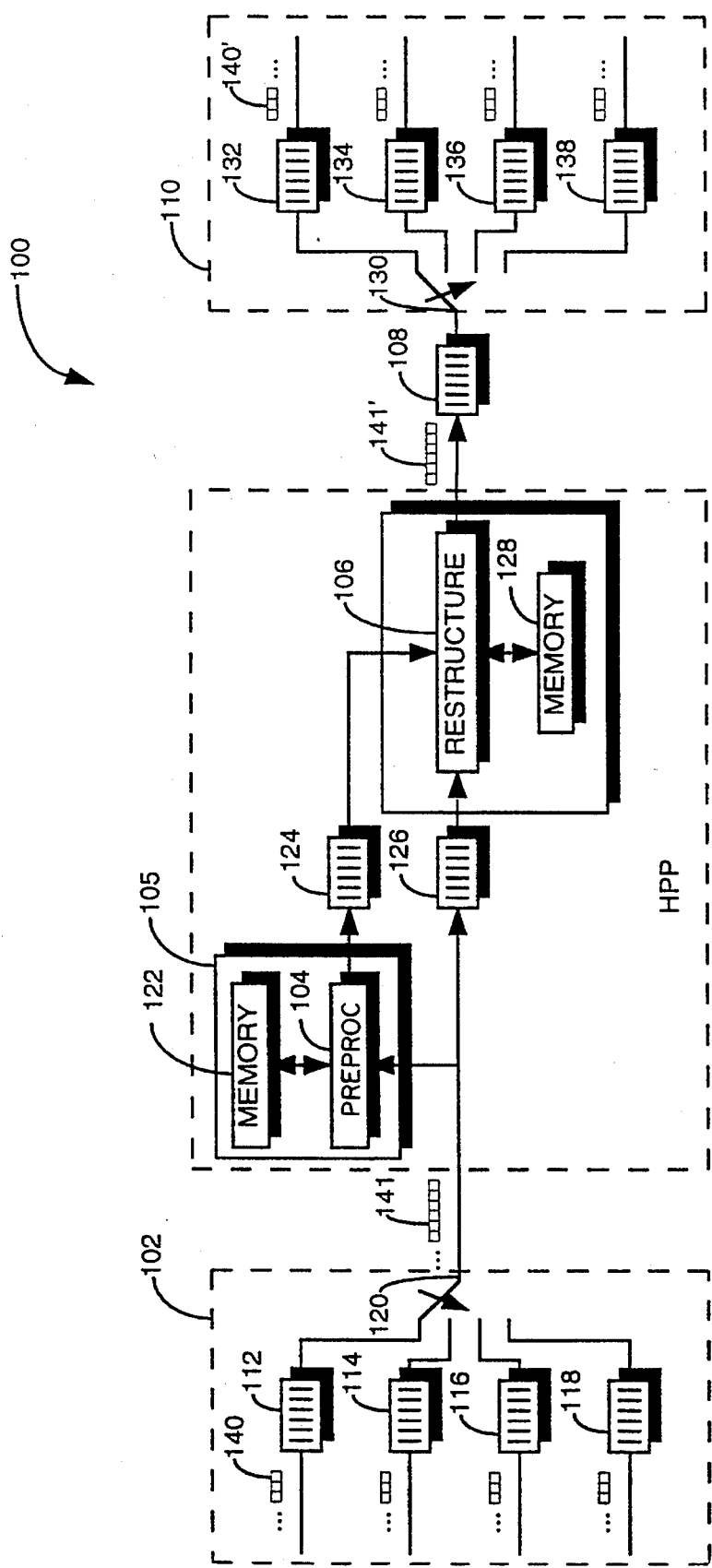
FIG. 2 is a block diagram of a preferred embodiment network device in accordance with the present invention.

Referring to FIG. 2, a preferred embodiment of a forwarding system in which a protocol data unit preprocessor 104 sometimes referred to as forwarding engine 104 is used in a protocol data unit processing device 100 that operates in a communication network to transfer protocol data units (e.g., 140) within the communication network. The processing device 100 manipulates bits of information preferably at the OSI network, link and physical layers, but can manipulate bits of information at all levels, and preferably performs as one or more network devices including, but not limited to, a bridge, a router, a switch, an inline filter, a protocol converter, an encapsulating device, and a security device. It will be appreciated that various types of communication networks exist which utilize processing devices that perform these functions including local protocol data unit source devices (e.g., desktop computers or workstations), local area networks, wide area networks, metropolitan area networks, and wireless networks. It will be appreciated by those skilled in the art that the processing device 100 may perform other network-based functions without departing from the scope and spirit of the present invention. In addition, other types of data in the communication network could readily be manipulated by the processing device 100, such as voice and video.

The processing device 100 includes an inbound interface 102 and outbound interface 110 which control the flow of protocol data units 140 and 140' into and out of the processing device 100, respectively (i.e., receive and transmit protocol data units. These interfaces 102 and 110 are configured differently depending on the type of communication network that the processing device 100 is connected to as well as the particular location within such a network that the processing device 100 is located.

For example, inbound interface 102 may include several memory buffers 112, 114, 116, and 118 which receive bits of information from several different network devices which are communicating bits of information on several types of OSI physical layer media (e.g., fiber optics, coaxial cable, or twisted pair wires) while using various types of OSI link layer signaling protocols (e.g., Fiber Distributed Data Interchange (FDDI) or ethernet) and various types of OSI network layer protocols (e.g., TCP/IP or DECnet). These network devices could be other processing devices (e.g., a matrix switching device or electronic bus) or end user devices (e.g., computers, network cards, video codecs, digital phones, other digitized video or audio sources such as voice, teleconferencing, or video conferencing, any other multimedia sources, or the like). The bits of information from the memory buffers 112, 114, 116, and 118 are combined together into a single stream of data bytes 141 by a demultiplexer 120 to form packets or cells. The demultiplexer 120 preferably combines the bytes of information of these packets or cells by periodically clocking information out of the memory buffers 112, 114, 116, and 118. In a similar manner, the outbound interface 110 includes a multiplexer 130 which periodically clocks a single stream of data bytes 141' out of memory buffer 108 and presents them to appropriate memory buffers 132, 134, 136, and 138 which are connected to outbound lines to the communication network. Alternatively, the inbound interface 102 and/or outbound interface 110 may consist of a single memory buffer and as such a multiplexer/demultiplexer arrangement as described would not be needed in the processing device 100.

The processing device 100 includes a preprocessor 104 which establishes subsequent processing requirements of a particular protocol data unit 140. The preprocessor 104 analyzes the inbound stream of data bits 141 from the inbound interface 102 to find the beginning of the particular protocol data unit 140 received from the communication network to generate at least one associated directive for the particular protocol data unit 140. A synchronizing mechanism 124, 126 sometimes referred to as buffers 124, 126 is operatively coupled to the preprocessor 104 to synchronize the particular protocol data unit 140 (i.e., stored in buffer 126) with the at least one associated directive (i.e., stored in buffer 124) to generate a synchronized protocol data unit. A restructuring device 106 is operatively coupled to the synchronizing mechanism 124, 126 to restructure the synchronized protocol data unit in accordance with the at least one associated directive for the protocol data unit to generate a restructured protocol data unit 140'.

By utilizing the preprocessor 104 and restructuring device 106 of the present invention to split the required protocol data unit processing functions, a significantly increase in the through put of the processing device 100, both in terms of the number of data packets per second and in terms of the number of bits per second which pass through the processing device 100 is achieved. It will be noted that buffers 112, 114, 116, 118 and synchronizing mechanisms 124 and 126 may not be required for all implanatations of the present invention.

The preprocessor 104 preferably establishes the subsequent processing requirements of the particular protocol data unit 104 by identifying, verifying, and generating at least one associated directive for the particular protocol data unit 140. These subsequent processing requirements fall into two distinct groups of processing types. The first group of processing types involves modifying the content of the synchronized protocol data unit. The restructuring device 106 does this modification preferably by restructuring the synchronized protocol data unit through deleting, inserting, and replacing bits in the synchronized protocol data unit in accordance with the at least one associated directive for the protocol data unit. The second group of processing types involves security or network monitoring functions. For this second group of processing types the restructuring device 106 monitors the synchronized protocol data unit by dropping, sending, sending a copy of, and auditing the contents of the synchronized protocol data unit in accordance with the at least one associated directive for the protocol data unit. The processing device 100 may be configured to perform either or both of these modification and monitoring processing functions. In addition, which processing functions may also be determined by the inbound memory buffers 112, 114, 116, or 118 from which the particular protocol data unit 140 originated.

In order to accelerate the processing of a received protocol data unit 140, the preprocessor 104 preferably is configured to operate on a first and a second protocol data unit such that the preprocessor 104 can interleave processing of both the first and the second protocol data unit during a single time span. In addition, multiple preprocessors connected in either parallel or series may be used to increase the through put of protocol data units. This use of multiple preprocessors may necessitate the use of a more sophisticated synchronizing mechanism 124, 126 which is able to track and synchronize more that one protocol data unit at a time with the particular at least one associated directive for each protocol data unit. In addition, the preprocessor 104 is configured to establish the at least one associated directive for the particular protocol data unit 140 after having received only a portion (i.e., the first several bits or bytes) of the protocol data unit 140. The preprocessor 104 may need to buffer into memory 122 or sequentially store a portion of the particular protocol data unit 140 as it is received until a large enough portion or the particular portion of the protocol data unit 140 which enables the identification of the particular protocol data unit 140 is received. Similarly, the restructuring device 106 preferably is configured to operate on the synchronized protocol data unit prior to the protocol data unit processing device 100 receiving all of the protocol data unit 140. This optimization can be taken a step further by outputting a portion of the restructured protocol data unit 140' to a transmitting device 110 prior to receiving all of the protocol data unit 140. Further, the restructuring device 106 preferably indicates a particular transmit path (e.g., into buffer memory 108 through mulitplexer 130 and transmitted from outbound interface 110 memory buffer 132 for one particular network type or media type connection onto the communication network) for the restructured protocol data unit 140'. All of these optimizations are particularly important when manipulating large protocol data units which extend over several frames or consist of several smaller parts that are received at various times and/or from various incoming interfaces 102.

Figure 3:
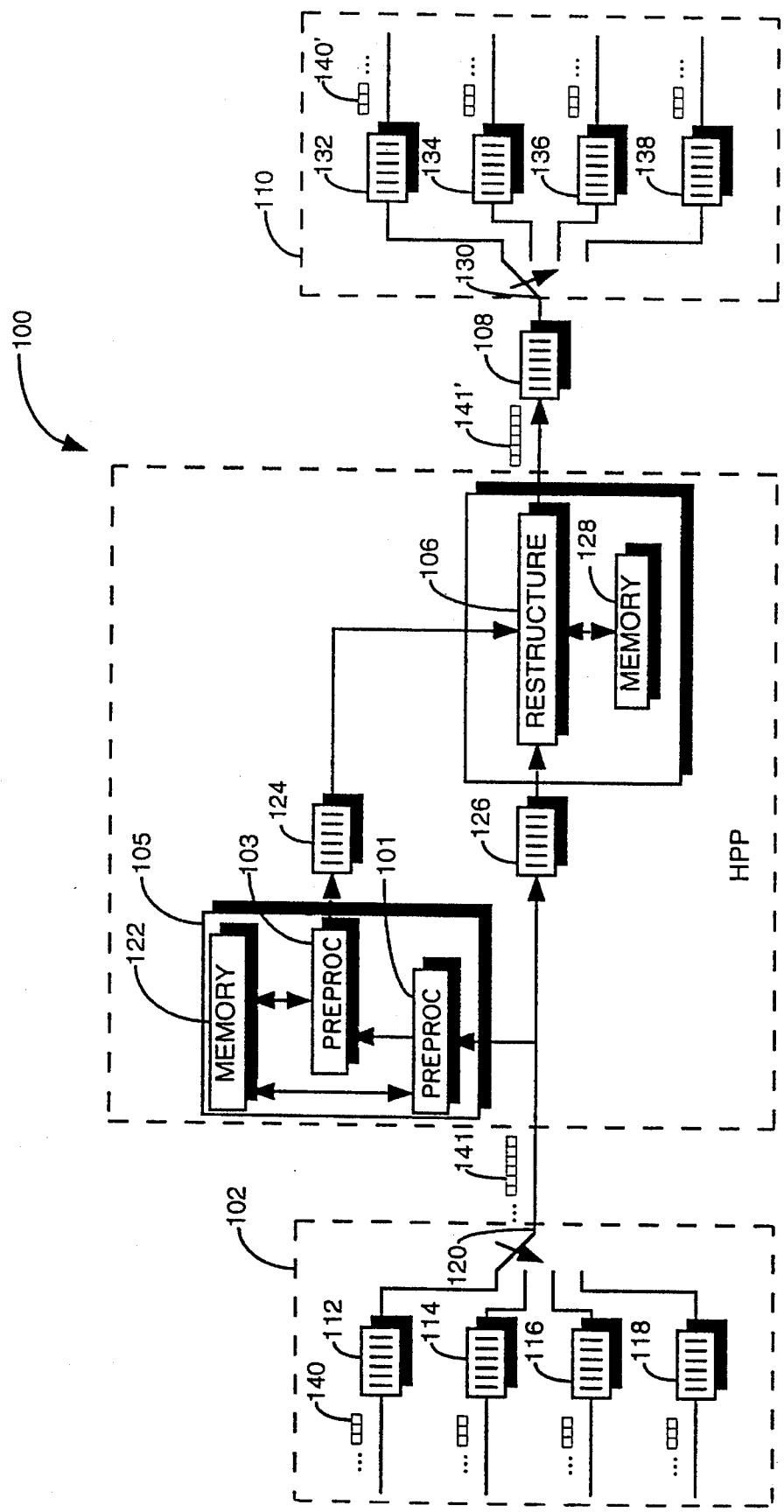
FIG. 3 is a block diagram of an alternative preferred embodiment network device having serial connected pre-processors in accordance with the present invention.

Turning once again to the multiple preprocessor configurations of the processing device 100. In the alternative embodiment serial configuration shown in FIG. 3, a first 101 and a second 103 preprocessor are operatively coupled to the inbound/receiving interface 102 to establishing subsequent processing requirements of a particular received protocol data unit 140 to generate at least one associated directive for the particular protocol data unit 140. The first preprocessor 101 is operatively connected in series to the second preprocessor 103 such that the first preprocessor 101 performs a portion of processing necessary for generating the at least one associated directive (i.e., as described above in reference to preprocessor 104) and the second preprocessor 103 completes the processing necessary for generating the at least one associated directive. In this alternative embodiment, the first preprocessor 101 preferably optimizes a identification process by selectively examining only significant bits of the particular protocol data unit 140 which affect radix decision-based identification process which involves selectively examining several significant bits of the particular protocol data unit 140 in a single step of the decision process. In addition, the first preprocessor 101 verifies the identification process by comparing a portion of the particular protocol data unit 140 with a predetermined tuple. This predetermined tuple consists of known values for specific portions of the particular protocol data unit 140 which are stored in memory 122. Also, the second preprocessor 103 preferably generates the associated directives for the protocol data unit 140 based on the verified identification process. The remaining parts of the processing device 100 operate substantially as described above in reference into a single preprocessor-based processing device.

Figure 4:
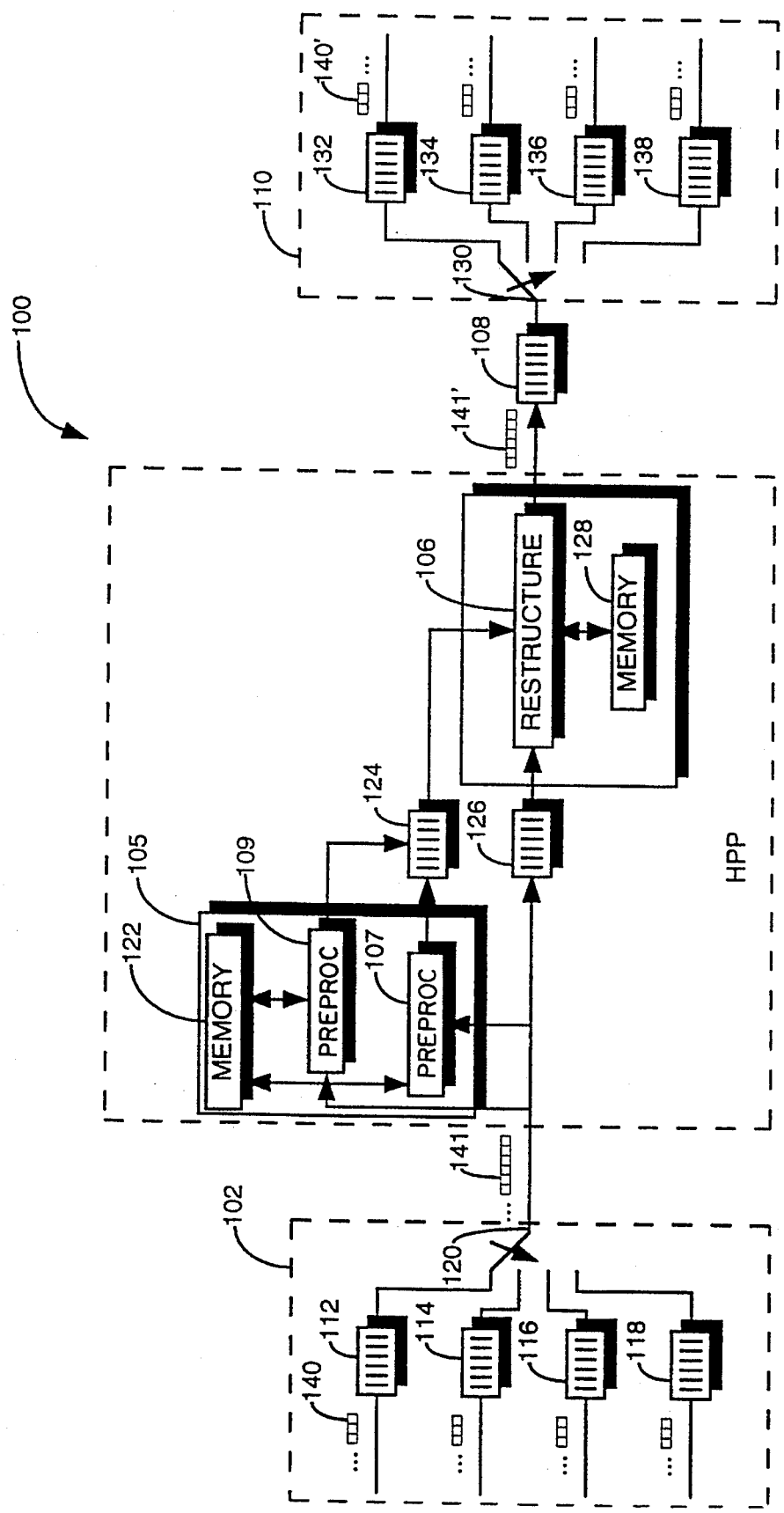
FIG. 4 is a block diagram of an alternative preferred embodiment network device having parallel connected pre-processors in accordance with the present invention.

In the alternative embodiment parallel configuration shown in FIG. 4, a first 107 and a second 109 preprocessor are operatively coupled to the inbound/receiving interface 102 to establishing subsequent processing requirements of a particular received protocol data unit 140 to generate at least one associated directive (i.e., as described above in reference to preprocessor 104) for the particular protocol data trait 140. Each preprocessor 107 and 109 is operatively connected in parallel to the inbound/receiving interface 102 and is optimized to perform the processing necessary for generating the associated directives for a particular type of protocol data unit. In this alternative embodiment, the first preprocessor 107 is optimized to perform the processing necessary for generating the associated directives for a particular type of protocol data unit which may differ from the second preprocessor 109 by having a particular physical layer media type, a particular link layer signaling protocol, and/or a particular network layer protocol which is different from the particular type of protocol data unit being manipulated by the second preprocessor 109. The remaining parts of the processing device 100 operate substantially as described above in reference into a single preprocessor-based processing device.

It will be appreciated by those skilled in the art that more than two preprocessors may be used to perform the functions described herein without departing from the scope and spirit of the present invention provided that the functions are divided in a manner consistent with the teachings of a serial and/or parallel connections as described above.

Figure 7:
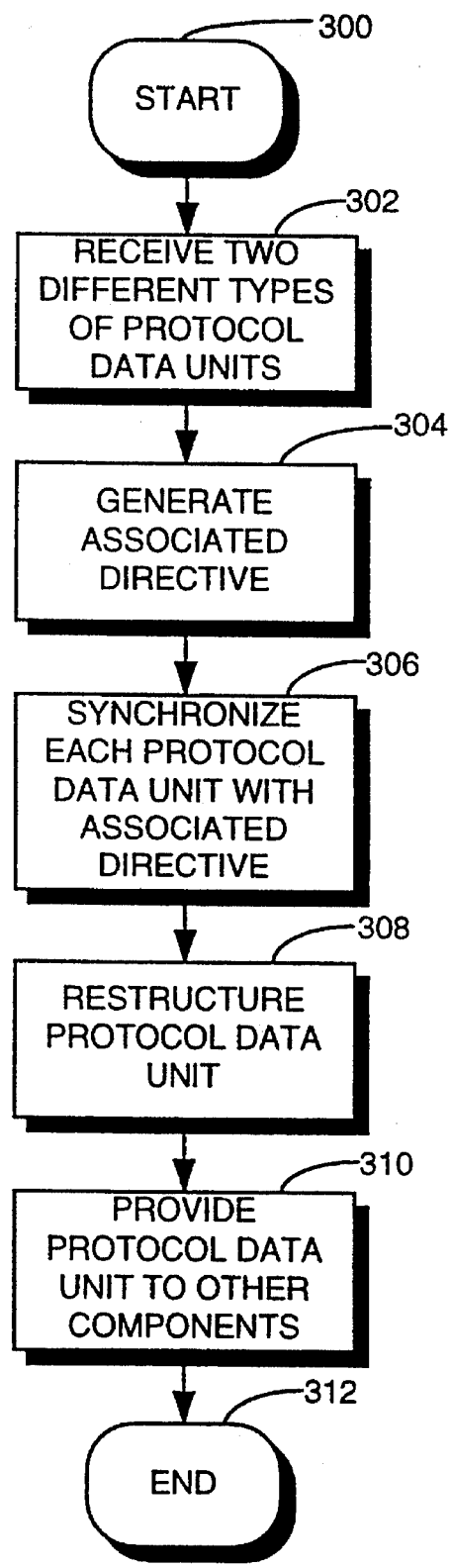
FIG. 7 is a flowchart of the preferred embodiment operations of the network device shown in FIG. 2 in accordance with the present invention.

The preferred embodiment method of operating the processing device 100 can be summarized in reference to the flowchart shown in FIG. 7. This method 300–312 is performed by device-implemented steps in a distinct processing steps that can be implemented in one or more processors. Furthermore, this preferred embodiment summary describes operations of the processing device 100 in a heterogeneous communication network; however, the processing device 100 can readily be used in a homogeneous environment without departing from the scope and spirit of the present invention. In the first processing step a first and a second protocol data unit are received 302 from the communication network where the first and the second protocol data unit are of different types. The second processing step involves establishing 304 the subsequent processing requirements of the first and the second protocol data unit to generate at least one associated directive for each protocol data unit. Each protocol data unit is synchronized 306 with the at least one associated directive for each protocol data unit to generate a first and a second synchronized protocol data unit, respectively. Then, each synchronized protocol data unit is restructured 308 in accordance with the associated directives for each protocol data unit to generate a first and a second restructured protocol data unit, respectively. Finally, the first and the second restructured protocol data unit are provided 310 to other components in the communication network.

The first and the second protocol data unit may differ from one another in several ways in the heterogeneous communication network including but not limited to being of different physical layer media types, different link layer signaling protocols, and/or different network layer protocols.

The following sections describes in detail the features required for the Hardware Packet Processor (HPP) or alternatively known as the protocol data unit processing device 100. The first concern is the overall architectural requirements needed for a new routing system to be viable. The primary requirement for a hardware-based system is that it must provide a full-function bridge/routing capability. Specifically, it must be able to handle bridging and routing of any protocol, new or existing, as well having a rich filtering capability.

Because new protocols and media are continually being developed, any hardware-based solution must be fully programmable, so that new protocols or changes to existing protocols can be supported without changes to the hardware. In addition, new and faster media are constantly being created. Any hardware-based architecture must be adaptable to accommodate newer, faster media. As a consequence of this, it is highly desirable that the routing system be well suited to pipelining and/or parallel processing.

A major requirement for modern bridge-routers is a protocol data unit "filtering" capability. Such tools are used to implement administrative policy on internetworks. The PCF and BCF capabilities of the bridge routers available from Network Systems Corporation, Minneapolis, Minn., are examples of such filtering tools. The following discusses the problem of filtering and discusses two different implementation approaches. It is assumed that any filtering scheme must provide the functionality currently available in the PCF/BCF packages. An ideal filtering function has several key requirements:

No impact to protocol data unit processing performance.

Fully functional, with at least as much capability as PCF/BCF.

Low to moderate cost/complexity.

Two different schemes for implementing filtering are discussed below. Both alternatives suffer from the nature of the current filtering scheme, which allows the creation of so-called "compound" filters. These filters are composed of many individual filters, which means that the processing time cannot be bounded. In order to ensure that the filtering process will complete in a specific time interval, the maximum complexity of a filter must be limited.

The first and most obvious approach to implementing a filtering capability is to build an engine that can process the existing PCF/BCF filters, which are actually compiled to a form that appears suitable for hardware execution. At appropriate points in the protocol data unit processing procedure, the filter engine could be called upon to run a specified set of filters, emulating the behavior of the existing software implementation.

The advantage of this approach is that it is fairly straightforward to implement and meets two of the three key requirements. Specifically, is full featured and relatively low in complexity. The major drawback of this approach is that it has a potentially large impact on processing performance. In particular, even fairly simple filters will have a major impact on system processing speed.

A more robust approach utilizes the same techniques as those used in the forwarding process. An examination of PCF filtering reveals that it is based on a simple pattern matching system that causes various "dispositions" to be applied to a protocol data unit. Given this, it is possible to integrate filters into a lookup tree structure. A particular location in the tree would depend on which "filter point" the filter was applied. Some of the dispositions result in modification of the message header, re-routing to different destinations or making a duplicate protocol data unit to be sent to a monitoring system.

FIG. 2 shows the general structure of the preferred embodiment hardware packet processing system. It is composed of a forwarding engine 104 that receives protocol data units 140 and is able to perform filtering and make forwarding decisions. The forwarding engine 104 passes protocol data units 140 to an output processing device 106, which performs any protocol data unit re-structuring required to make the protocol data units 140 ready for transmission on the outbound media.

The protocol data units 140 are then sent through an interconnect system 110, such as a crosspoint switch, to an output port, where they are queued for transmission. The interconnection device 110 must be able to perform physical multicasting. This is required so that any necessary protocol data unit duplication will not cause added latency in the system.

Prior to transmission on a network medium, modification of the protocol data unit 140 headers is required. The output processor 106 performs the necessary modifications prior to protocol data unit transmission. This process involves some or all of the following operations:

Addition, Deletion, Modification of selected fields

Message Fragmentation

Translation of addresses

Computation of new checksums

The output/restructuring 106 processor executes the associated directives as a series of "rewrite instructions" located in buffer 124 that are associated with a protocol data unit that is presented at the "incoming protocol data units" buffer 126. It will be appreciated by those skilled in the art that these buffers 124 and 126 may be implemented as first-in-first-out (FIFO) buffers. In addition, an output/restructuring processor memory 128 is used to provide pre-computed information such as media access control (MAC) layer headers, as well as to provide instruction streams for pre-defined operations. The restructuring processor 106 executes the associated directives in the form of the supplied instructions from buffer 124, which results in a ready-to-transmit protocol data unit (or protocol data units, in the case of IP fragmentation).

The output/restructuring processor 106 preferably uses a fairly simple instruction set. The instructions control the filling of an output FIFO buffer 108 with protocol data unit fragments. This process continues until an entire restructured protocol data unit 140' is formed and ready for transmission. The protocol data unit fragments preferably are supplied to the output FIFO buffer 108 in transmission order. The sources of fragments include the incoming protocol data unit FIFO buffer 126, explicitly by an instruction from buffer 124, or from the restructuring processor memory 128.

The instruction set preferably includes the following operations:

Source bytes from protocol data unit FIFO buffer 126 (N bytes or until end-of-protocol data unit)

Source bytes from restructuring processor memory 128

Source bytes from instruction FIFO buffer 124

Skip in protocol data unit FIFO buffer 126

Call restructuring processor memory 128 Subroutine

Forward protocol data unit

The following details the structure of a "forwarding engine" (FE) or decision processor 104. It will be appreciated by those skilled in the art that this represents one possible embodiment for implementing a working system which performs the functions described herein; however, several modifications or additions may be made without departing from the scope and spirit of the present invention.

The key concept behind the forwarding engine 104 is that the lookup tree is not referenced by code that performs protocol data unit processing. Rather, the lookup tree is the protocol data unit processing program. The forwarding engine 104 preferably is a special-purpose processor executing an instruction set that embodies a radix-tree decision network. Radix-tree decision networks are more thoroughly discussed in the previously identified related U.S. patent application Ser. No. 08/366,222 entitled "Method And Apparatus For Radix Decision Packet Processing".

Figure 5:
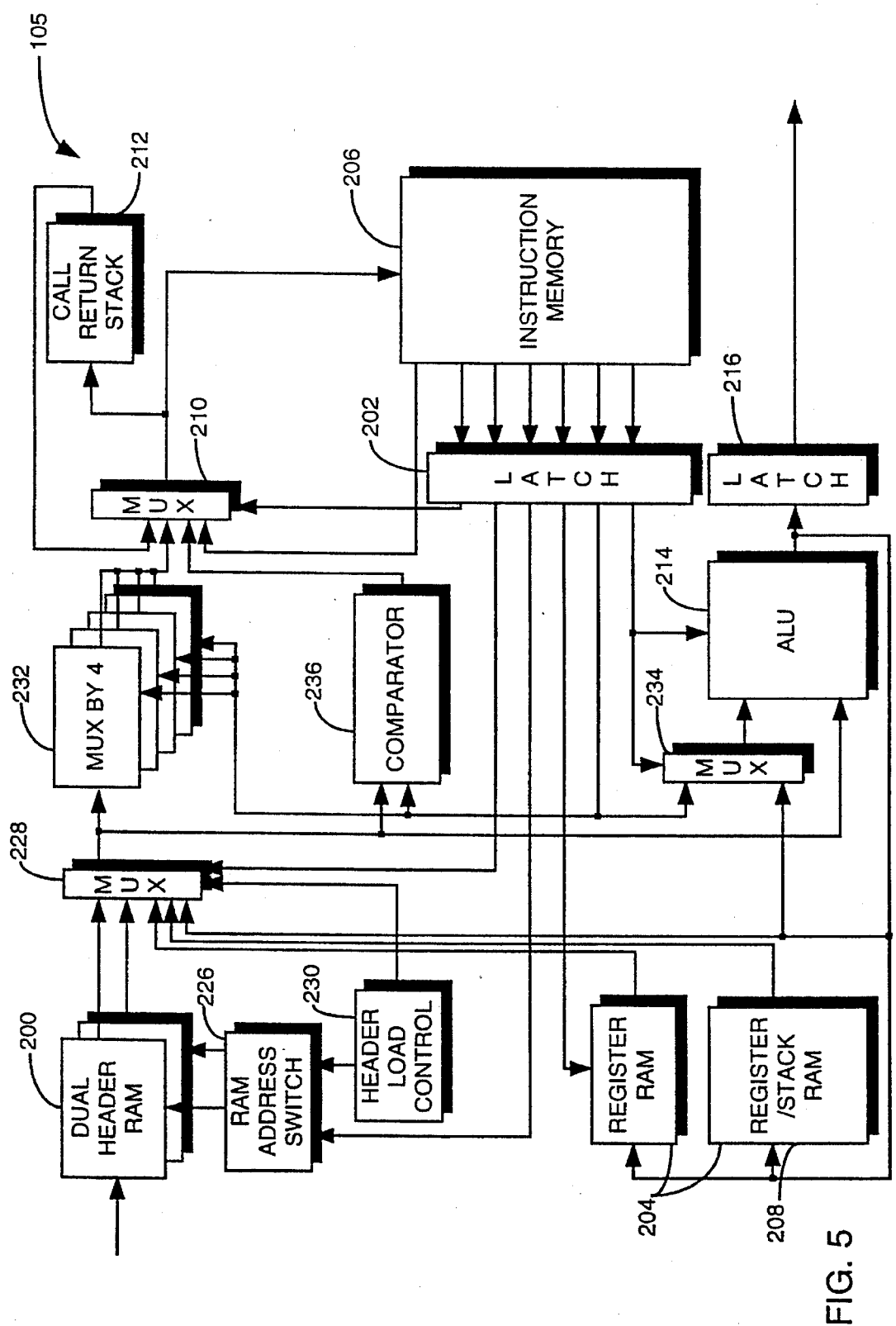
FIG. 5 is a block diagram of a preferred embodiment decision processor and memory of the preferred embodiment network device shown in FIG. 2 in accordance with the present invention.

As shown in FIG. 5, conceptually, the combination 105 of FE/decision processor 104 and associated state memory 122, as shown in FIG. 2, consist of a 32 bit by 16 bit dual header random access memory (RAM) (also called a "window" register) 200 that provides specialized access to the contents of a protocol data unit header, a "start" register or latch memory 202 that specifies the first instruction to execute on reception of a protocol data unit, an instruction memory 206 that holds the instructions or tree, a set of working registers (i.e., RAM) 204, the "bit gathering" logic 226–236, a small stack (i.e., RAM) 208, which can be used to implement a "Patricia" style of radix-tree address lookup scheme, a multiplexer with a latch memory that performs the function of a current address register 210, return address stack or register RAM 212, an arithmetic and logic unit (ALU) 214, and an interface latch (I/F) 216 to the rewrite FIFO buffer 124.

The "bit gathering" logic 226–236 is used to move bits of data around the FE 104. In particular, RAM address switch 226 provides a dual address for the dual header RAM 200 which determines which portion of the stored protocol data unit header are output to multiplexer 228. The RAM address switch 226 receives instructions from the current instruction register 202 and a header load control circuit 230. Header load control circuit 230 along with the current instruction register 202 also provides the selection controls which determine which protocol data unit header bits or other information from the working registers 204, the stack 208, or ALU 214 is output by multiplexer 228. Multiplexer 228 outputs the bits of information to a 16 bit wide and 4 bit deep multiplexer 232 which generates a mask vector used by the current address register 210. Multiplexer 228 also outputs the information bits to the ALU 214 through another multiplexer 234 and to a comparator 236. Comparator 236 performs less than, greater than, and equal to comparisons of the multiplexer 228 output and current instruction register 202 data as needed by the FE 104 and outputs the results to the current address register 210 which mulitplexes various information bits to the instruction memory 206 and call return stack 212 as requested by FE 104 instructions.

As previously noted, the FE 104 contains several registers including the window register 200, the start or current instruction register 202, the return address register 212, and several general purpose working registers 204.

The window register 200 provides access to a portion of the bits in a protocol data unit header. This register 200 holds the first 512 bits of a protocol data unit. It is possible to move the window forward in the header by using an advance instruction (discussed below).

The start/current instruction register 202 contains the first instruction to be executed when a new protocol data unit arrives. This instruction controls the operations of several FE 104 components including the RAM address switch 226, working registers 204, ALU 214, and multiplexers 210, 228, 232, and 234.

The return address register 212 contains the address where execution will continue after a return instruction is executed.

The stack 208 preferably is a 32 deep last-in-first-out (LIFO) stack.

The working registers 204 are used to hold intermediate information.

The FE 104 instruction set consists of two primary instructions that perform comparisons and vector jumps on a bit string extracted from the window register 200. Ancillary instructions are provided for register and stack operations, subroutine calls and arithmetic functions.

Figure 6:
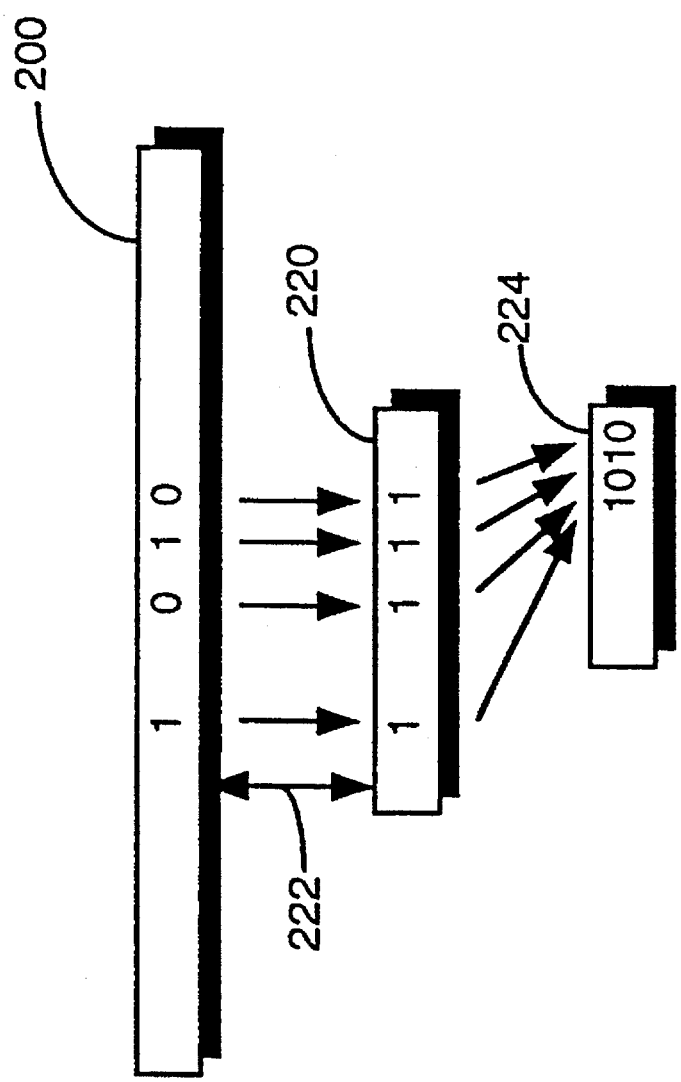
FIG. 6 is a block diagram depicting a bit gathering operation in accordance with the present invention utilized by the preferred embodiment network device shown in FIGS. 2 and 5.

The FE 104 utilizes a "bit gathering" operation, which is used to realize a radix-tree compression. FIG. 6 diagrams this "Bit Gathering" operation. The index value 222 specifies the alignment of a "gather mask" 220 within the window register 200. A '1' in the gather mask 220 specifies that the corresponding bit in the window register 200 is to be included in the result. All result bits are then "compressed" right to create the result 224.

One bit gather instruction is the bit gather compare jump (3 way) which extracts a selected group of bits front the window register 200, based on the values of the starting bit location and the gather mask 220. The resultant bit string 224 is compared with a constant. Control then passes to one of three possible destination addresses for less than, equal, or greater than results. The compare jump instruction preferably has the form shown in Table 1.

TABLE 1

| COMPARE | SRC, StartBit, GatherMask, Comparand, Dest1, Dest2, Dest3 |
|---|---|
| where, | |
| SRC | The source of the data to be compared which is derived from either the window register 200 or a working register 204. |
| StartBit | The Starting bit position in the window register 200. |
| GatherMask | A constant specifying the bits to gather for the comparison operation. |
| Comparand | The constant to be used in the compare operation. The source of the constant can be a working register 204, or an immediate value contained in the instruction. |
| Dest N | A destination address to jump to based on the result of the compare. |

Another bit gather instruction is the bit gather vector jump (N way) instruction. The vector jump instruction is similar to the compare jump in that it extracts a bit string in a similar manner. The difference is that it uses the resultant string as an index into a table of destination addresses. The vector jump preferably has the form shown in Table 2.

TABLE 2

| VECTOR | SRC, StartBit, GatherMask, [Dest,...] |
|---|---|
| where, | |
| SRC | The source of the data to be compared which is derived from either the window register 200 or a working register 204. |
| StartBit | The Starting bit position in the window register 200. |
| GatherMask | A constant specifying the bits to gather for the jump operation. |
| Dest N | A list of destination addresses that are the targets of the vector jump. The number of destinations equals the power of two represented by the number of '1' bits in the GatherMask. |

Another bit gather instruction is the bit gather load instruction. The bit gather load instruction performs a bit gather and places the result of the operation into an internal register. The bit gather load preferably has the form shown in Table 3.

TABLE 3

| BGLOAD | SRC, StartBit, GatherMask, Dest |
|---|---|
| where, | |
| SRC | The source of the data to be compared which is derived from either the window register 200 or a working register 204. |
| StartBit | The Starting bit position in the window register 200. This may be a value from a register or an immediate value. |
| GatherMask | A constant specifying the bits to gather for the jump operation. |
| Dest | The working register 204 to hold the results. |

Some ancillary instructions include a load instruction, shown in Table 4, which is used to move data between registers. It is also used to load immediate values into registers.

TABLE 4

| LOAD | Dest, SRC, [Value] |
|---|---|
| where, | |
| SRC | Indicates the source of the data to be loaded. This can be another register or an immediate value |
| Dest | Indicates the register that is being loaded. This can be a working register 204 or the FIFO buffer 124. |
| Value | If the source is an immediate value, then this is the constant that is loaded. |

Another ancillary instruction is the push instruction, shown in Table 5, which is similar to a load instruction, but it places the value on the top of the stack 208.

TABLE 5

| PUSH | SRC |
|---|---|
| where, | |
| SRC | Indicates the source of the data to be loaded. This can be another register. |

Pop, shown in Table 6, is an ancillary instruction which loads a register with the top value on the stack 208.

TABLE 6

| POP | Dest |
|---|---|
| where, | |
| Dest | Indicates the register that is being loaded. This can be a working register 204 or the FIFO buffer 124. |

The add ancillary instruction, shown in Table 7, performs simple addition.

TABLE 7

| ADD | SRC, Dest, Value |
|---|---|
| where, | |
| SRC | Indicates the source register to be operated on. |
| Dest | Indicates the register to receive the results of the addition operation. |
| Value | A constant to be added to the source value. |

The substract ancillary instruction, shown in Table 8, performs simple subtraction.

TABLE 8

| SUB | SRC, Dest, Value |
|---|---|
| where, | |
| SRC | Indicates the source register to be operated on. |
| Dest | Indicates the register to receive the results of the subtraction operation. |
| Value | A constant to be subtracted from the source value. |

The forward ancillary instruction, shown in Table 9, forwards the packet to the output processor. Forwarding Engine 104 execution stops after execution of a forward instruction.

TABLE 9

| FORWARD | Dest |
|---|---|
| where, | |
| Dest | This data is placed in the FIFO buffer 124 and supplies the output processor 106 with the internal address for sending the ready-to-transmit protocol data unit 140'. |

The drop ancillary instruction, shown in Table 10, causes the protocol data unit 140 to be dropped from the system.

Forwarding Engine 104 execution ceases after completing the drop operation.

TABLE 10

DROP

The FE 104 begins to execute instructions when a new protocol data unit 140 arrives. The starting instruction address is specified by the contents of the start register 202. Execution continues until either a forward or drop instruction is executed, at which point execution ceases until another protocol data unit is available for processing. Instructions are executed in sequence until a compare or vector instruction causes a branch.

Several sample programs for forwarding engine 104 are provided to show how various protocols can be handled. Two of the examples cover typical cases for Internetwork Packet Exchange (IPX) and IP type protocol data unit manipulation and forwarding. Another example is an IP case that requires fragmentation. It will be appreciated by those skilled in the art that these examples are not meant to show all possible special cases, but to merely suggest some possible applications for the teachings of the present invention.

Table 11 depicts a sample forwarding program for a simple IPX network. In this example, the router is aware of four reachable networks, numbered 1, 2, 3 and 4. In addition, the packet source is Ethernet. It should be appreciated that this is only a program fragment, because other program code for checking exceptions also should be made, but the code to handle them is not shown.

The program first determines the protocol type by examining bits in the Ethertype field. Next, it check for the special case of a zero hop count and a zero source network number. In this case, it is necessary to set the network number in the protocol data unit. Then, the hop count if checked for a value of 15, which is the maximum hop count. If all these tests are passed, the destination address is found and parsed. This results in a vector to a final check and forward operation.

The depth of this tree structure is twelve instructions for normal case protocol data units. This corresponds to 2 million protocol data units per second with a 40 nanosecond (ns) cycle time. If a larger assigned address space is used, then a somewhat deeper tree would result. The upper bound on this tree structure is 39 instructions, which is the case if the entire IPX address space is in use. This corresponds to a performance level of 600,000 protocol data units per second. The actual tree structure depth in a live network depends upon the entropy of the addresses that are in use, which is likely to result in fairly shallow tree structure.

TABLE 11

| | | |
|---|---|---|
| Start: | Vector IPX | Win, 60, A000, Branch1, DECnet, Branch2, |
| Branch1: | Vector | Win, 60, 0804, XNS, Unknown, IP, ARP |
| Branch2: | Vector Unknown | Win 60, 1200, Unknown, ATARP, Test, |
| Unknown: | Drop | |
| IPX: | Compare Unknown | Win, 60, FFFF, FFFF, Unknown, Next, |
| | Compare HC_Exceed | Win, 90, FF00, 0F00, Next, HC_Exceed, |
| | Compare IPX_Dest | Win, 90, FF00, 0000, IPX_Dest, Next, |
| | Compare IPX_Dest | Win, 150, FFFF, 0000, IPX_Dest, Next, IPX_Dest |
| | Compare IPX_Dest | Win, 160, FFFF, 0000, IPX_Dest, Need_Fix, |
| IPX_Dest: | Compare Not_Found | Win, 90, FFFF, 0000, Not_Found, Next, |
| | Vector | Win, 110, 000F, Not_Found, Net1, Net2, Net3, Net4, Not_Found, Not_found, Not_Found, Not_Found, Not_Found, Not_Found, Not_Found, Not_Found, Not_Found, Not_Found, Not_Found |
| Net1: | Compare Not_Found | Win, 110, FFFF, 0001, Not_Found, Next, |
| | Load | FIFO, Immediate, Call_IPX_Standard |
| | Load | FIFO, Net_1_MAC_info |
| | Forward | 1 |
| Net2: | Compare Not_Found | Win, 110, FFFF, 0002, Not_Found, Next, |
| | Load | FIFO, Immediate, Call_IPX_Standard |
| | Load | FIFO, Net_2_MAC_info |
| | Forward | 2 |
| Net3: | Compare Not_Found | Win, 110, FFFF, 0003, Not_Found, Next, |
| | Load | FIFO, Immediate, Call_IPX_Standard |
| | Load | FIFO, Net_3_MAC_info |
| | Forward | 3 |
| Net4: | Compare Not_Found | Win, 110, FFFF, 0004, Not_Found, Next, |
| | Load | FIFO, Immediate, Call_IPX_Standard |
| | Load | FIFO, Net_4_MAC_info |
| | Forward | 4 |

The example in Table 12 shows a "normal" case of IP processing. No options are present, a path to the destination exists, and no fragmentation is required. In addition, the forwarding table contains three IP destination networks. Ethernet encapsulation is assumed. This tree structure has a depth of fourteen instructions, with a cycle time of 40 ns, which corresponds to a processing speed of 1.5 millions protocol data units per second. The maximum tree structure depth could be considerably deeper, if many special options are in use, but the likely average depth should be around 20–25 cycles for large networks, which would represent a performance of about 1 million protocol data units per second.

TABLE 12

| | | |
|---|---|---|
| Start: | Vector | Win, 60, A000, Branch1, DECnet, Branch2, IPX |
| Branch1: | Vector | Win, 60, 0804, XNS, Unknown, IP, ARP |
| Branch2: | Vector | Win, 60, 1200, Unknown, ATARP, Test, Unknown |
| Unknown: | Drop | |
| IP: | Compare | Win, 112, 0xFF, 0x45, IP_Special, Next, IP_Special |
| Compute_ttl: | Compare | Win, 192, 0xFF, 0, Next, TTL_Exceed, Next |
| | Bgload | Win, 192, 0xFF, WR1 |
| | Sub | WR1, WR1, 1 |
| IP_Lookup: | Bgload | Win, 240, 0xFFFF, WR0 |
| | Vector | Win, 240, 0x4010, Net1, Net2, Net3, Net3 |
| Net1: | Compare | Win, 240, 0xFFFF, 0x81BF, Not_found, Next, Not_found |
| | Load | FIFO, Immediate, Execute_Standard_IP |
| | Load | FIFO, Net1_MAC_Addr |
| | Load | FIFO, WR0 |
| | Forward | xx |
| Net2: | Compare | Win, 240, 0xFFFF, 0x81C0, Not_found, Next, Not_found |
| | Load | FIFO, Immediate, Execute_Standard_IP |
| | Load | FIFO, Net2_MAC_Addr |
| | Load | FIFO, WR0 |
| | Forward | xx |
| Net3: | Compare | Win, 240, 0xFFFF, 0xC009, Not_found, Next, Not_Found |
| | Load | FIFO, Immediate, Execute_Standard_IP |
| | Load | FIFO, Net3_MAC_Addr |
| | Load | FIFO, WR0 |
| | Forward | xx |

The following example, shown in Table 13 is more complex. It shows the code fragments needed to process an IP protocol data unit that contains a loose source routing with record route option.

TABLE 13

| | | |
|---|---|---|
| Start: | Vector | Win, 60, A000, Branch1, DECnet, Branch2, IPX |
| Branch1: | Vector | Win, 60, 0804, XNS, Unknown, IP, ARP |
| Branch2: | Vector | Win, 60, 1200, Unknown, ATARP, Test, Unknown |
| Unknown: | Drop | |
| IP: | Compare | Win, 112, 0xFF, 0x45, IP_Special, Next, IP_Special |
| IP_Special: | Compare | Win, 112, 0xF, 0x4, Bad_versionNext, Bad_version |
| | BGLoad | Win, 208, 0xFFFFFFFF, WR2 |
| | Compare | Win, 116, 0xF, 0x5, Bad_HL, Next, Opts_present |
| Opts_present: | Call | Look_For_SSR |

TABLE 13-continued

| | | |
|---|---|---|
| | Compare | WR0, 0, 0xF, 1, No_SR, Next, No_SSR |
| ; This is a Strict Source Route packet | | |
| | Bgload | Win, 208, 0xFFFFFFFF, WR2 |
| | Call | lookup_WR2 |
| | Compare | WR0, 0, Local, SSR_Bad_Hop, Next, SSR_Bad_Hop |
| ; This Hop is OK, so get next hop, if any | | |
| | Call | Get_SSR_Next_Hop |
| | Compare | WR0, 0, 0xF, No_Hops, Next, Local_Recieve, Next |
| ; Finish off the packet | | |
| | Call | lookup_WR2 |
| | Compare | WR0, 0, 0xF, Normal, Next, Finish_SR, Next |
| ; Exception processing for bad next-hop lookup goes here | | |
| Finish_SR: | Load | FIFO, Immediate, Execute_New_MAC |
| | Load | FIFO, WR3 |
| | Load | FIFO, Immediate, Skip_to_Dest |
| | Load | FIFO, Immediate, Stamp_new_dest |
| | Load | FIFO, WR2 |
| | Call | record_route |
| | Load | FIFO, Immediate, Finish_options |
| | Forward | xxx |
| ; This routine scans the options list looking for ; possible next-hop addresses (LSRR, SSRR) | | |
| Look_for_SR: | Load | WR8, Immediate, 272 |
| Next_opt: | Bgload | Win, WR8, 0xFF, WR9 |
| | Compare | WR9, 0, 0xFF, 0x89, Next, Found_SR, Next |
| | Compare | WR9, 0, 0xFF, 0x83, Next, Found_SR, Next |
| | Add | WR8, WR8, 8 |
| | GoTo Next_opt | |
| Found_SR: | Load | WR0, Immediate, 1 |

A single forwarding engine system 104 realized using floating point gate array (FPGA) technology, with a 40 ns cycle time, should result in a system that is essentially media-speed capable for data rates of around 400–500 megabits per second and protocol data unit rates around 1 million per second. In order to accommodate gigabit rate media an enhanced architecture is required. Several possible methods to increase performance levels into the gigabit range and beyond are provided below.

By implementing the forwarding engine 104 and rewrite engines 106 as application specific integrated circuits (ASICs), a speed increase can be realized by reducing the basic cycle time of these components.

In addition, by utilizing multiple forwarding engines 104 (parallelizing the operations), the forwarding performance can be increased to N times the performance of a single engine. Multiple rewrite engines may also be required. A key disadvantage of such a system is that the cost increases by at least N times as well. In contrast to the prior art parallel processing techniques which are based on dividing tasks by type of network interface required, the present invention approach is based on dividing tasks for individual processors by the function to be performed. This function-based division of tasks enables parallelizing the operations while not be limited by a "processor bottleneck" which limits the prior art parallel processing techniques.

It will be appreciated by those skilled in the art that the forwarding engine 104 structure may be modified to be suitable for pipeline processing. Each stage of the pipeline executes a portion of the processing for each protocol data unit. The advantage of such a system is that is should require less memory to achieve that same level of performance obtained by the parallel forwarding engine structure.

In order to handle all special cases, particularly for IP protocol data units, a large amount of state information is required. In order to create a pipelined system, it is necessary for each stage of the pipeline to have access to this common state information. This would require that the forwarding engine 104 register set be expanded to provide a complete register set for each pipeline stage. The register set preferably would "follow" a specific protocol data unit through the pipeline. Such a register set would, of necessity, be very high performance, resulting is some cost increases;

While there are a number of possible approaches to realizing systems based on this technology, at least one possible approach is to build a pilot system utilizing off-the-shelf FPGA technology. This approach has a number of advantages. It lends a great deal of flexibility during and after the design process which will be needed to accommodate changing requirements. It also leaves the door open to additional experimentation and innovation without requiring additional investments in experimental platforms. The only real drawback of such a strategy is that it does not provide a system that fully realizes the potential of this technology which can only be achieved with ASICs tailored to this specific product.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

What is claimed is:

1. A protocol data unit processing device for use in a communication network to transfer protocol data units within the communication network, the protocol data unit processing device comprising:
   (a) preprocessor means for establishing subsequent processing requirements of a particular protocol data unit received from the communication network to generate at least one associated directive for the particular protocol data unit;
   (b) synchronizing means, operatively coupled to the preprocessing means, for synchronizing the particular protocol data unit with the at least one associated directive for the particular protocol data unit to generate a synchronized protocol data unit; and
   (c) restructuring means, operatively coupled to the synchronizing means, for restructuring the synchronized protocol data unit in accordance with the at least one associated directive for the protocol data unit to generate a restructured protocol data unit.

2. The protocol data unit processing device of claim 1 wherein the preprocessor means includes means for establishing subsequent processing requirements of the particular protocol data unit by identifying, verifying, and generating at least one associated directive for the particular protocol data unit.

3. The protocol data unit processing device of claim 1 wherein:
   (a) the preprocessor means includes means for operating on a first and a second protocol data units such that the preprocessor means can interleave processing of both the first and the second protocol data units during a single time span; and
   (b) the synchronizing means comprises means for synchronizing both the first and the second protocol data units with the at least one associated directive for that particular protocol data unit.

4. The protocol data unit processing device of claim 1 wherein the preprocessor means includes means for establishing the at least one associated directive for the particular protocol data unit based upon only a portion of the protocol data unit which enables an identification of the particular protocol data unit.

5. The protocol data unit processing device of claim 4 wherein the preprocessor means includes means for sequentially storing the particular protocol data unit as it is received until the portion of the protocol data unit which enables the identification of the particular protocol data unit is received.

6. The protocol data unit processing device of claim 5 wherein:
   (a) the preprocessor means includes means for establishing subsequent processing requirements based upon the stored portion of the particular protocol data unit; and
   (b) the synchronizing means comprises means for storing a portion of the particular protocol data unit such that the particular protocol data unit can be synchronized with the at least one associated directive for the particular protocol data unit.

7. The protocol data unit processing device of claim 4 wherein the restructuring means operates on the synchronized protocol data unit prior to the protocol data unit processing device receiving all of the protocol data unit.

8. The protocol data unit processing device of claim 7 wherein the restructuring means includes means for outputting a portion of the restructured protocol data unit to a transmitting device prior to receiving all of the protocol data unit.

9. The protocol data unit processing device of claim 1 wherein the restructuring means includes means for restructuring the synchronized protocol data unit by deleting, inserting, and replacing bits in the synchronized protocol data unit in accordance with the at least one associated directive for the protocol data unit.

10. The protocol data unit processing device of claim 1 wherein the restructuring means includes means for monitoring the synchronized protocol data unit by dropping, sending, sending a copy of, and auditing the contents of the synchronized protocol data unit in accordance with the at least one associated directive for the protocol data unit.

11. The protocol data unit processing device of claim 1 further comprising receiving means, operatively coupled to the preprocessor means, for receiving the protocol data unit from the communication network.

12. The protocol data unit processing device of claim 1 further comprising transmitting means, operatively coupled to the restructuring means, for transmitting the reconstructed protocol data unit over the communication network.

13. The protocol data unit processing device of claim 1:
   (a) wherein the restructuring means includes means for indicating a particular transmit path for the restructured protocol data unit; and
   (b) further comprising a plurality of transmitting means, operatively coupled to the restructuring means, for transmitting the restructured protocol data unit over the communication network via the particular transmit path indicated by the restructuring means.

14. The protocol data unit processing device of claim 1 wherein:
   (a) the protocol data unit processing device is selected from the group consisting of a bridge, a router, a switch, an inline filter, a protocol converter, an encapsulating device, and a security device;

(b) the protocol data unit is selected from the group consisting of a frame, a cell, and a packet;

(c) the communication network is selected from the group consisting of local area network, wide area network, metropolitan area network, and wireless network; and (d) the communication network transfers protocol data units having a content selected from the group consisting of voice, video, and data.

15. A protocol data unit processing device for use in a communication network to transfer protocol data units within the communication network, the protocol data unit processing device comprising:

(a) a first and a second preprocessor, operatively coupled to a receiving mechanism, for establishing subsequent processing requirements of a particular received protocol data unit by generating at least one associated directive for the particular protocol data unit, the first preprocessor being operatively connected in series to the second preprocessor such that the first preprocessor performs a portion of processing necessary for generating the at least one associated directive and the second preprocessor completes the processing necessary for generating the at least one associated directive;

(b) synchronizing means, operatively coupled to the preprocessors, for synchronizing the particular protocol data unit with the at least one associated directive for the particular protocol data unit to generate a synchronized protocol data unit;

(c) restructuring means, operatively coupled to the synchronizing means, for restructuring the synchronized protocol data unit in accordance with the at least one associated directive for the protocol data unit to generate a restructured protocol data unit; and (d) presenting means, operatively coupled to the restructuring means, for providing the restructured protocol data unit to a transmitting mechanism.

16. The protocol data unit processing device of claim 15 wherein:

(a) the means for optimizing the first preprocessor a identification process by selectively examining only significant bits of the particular protocol data unit which affect an identification process and verifying the identification process by comparing a portion of the particular protocol data unit with a predetermined tuple; and (b) the second preprocessor comprises means for generating the at least one associated directive for the protocol data unit based on the verified identification process.

17. The protocol data unit processing device of claim 16 wherein the means for optimizing the first preprocessor comprises means for selectively examining significant bits of the particular protocol data unit according to a radix decision process.

18. The protocol data unit processing device of claim 16 wherein the first preprocessor means for optimizing comprises means for selectively examining several significant bits of the particular protocol data unit in a single step of the decision process.

19. The protocol data unit processing device of claim 16 wherein the predetermined tuple consists of known values for specific portions of the particular protocol data unit.

20. The protocol data unit processing device of claim 15 wherein:

(a) each preprocessor comprises means for operating on a first and a second protocol data units such that each preprocessor can interleave processing of both the first and the second protocol data units during a single time span; and (b) the synchronizing means comprises means for synchronizing both the first and the second protocol data units with the at least one associated directive for that particular protocol data unit.

21. The protocol data unit processing device of claim 15 wherein the restructuring means operates on the synchronized protocol data unit prior to the protocol data unit processing device receiving all of the protocol data unit.

22. The protocol data unit processing device of claim 15 further comprising the receiving mechanism, operatively coupled to the first and the second preprocessor means, which receives the particular protocol data unit from the communication network, the communication network being selected from the group consisting of a local protocol data unit source device, a local area network, a wide area network, a metropolitan area network, and a wireless network.

23. The protocol data unit processing device of claim 15 further comprising the transmitting mechanism, operatively coupled to the presenting means, which transmits the restructured protocol data unit over the communication network, the communication network being selected from the group consisting of a local protocol data unit source device, a local area network, a wide area network, a metropolitan area network, and a wireless network.

24. A protocol data unit processing device for use in a communication network to transfer protocol data units within the communication network, the protocol data unit processing device comprising:

(a) a first and a second preprocessor, operatively coupled to a receiving mechanism, for establishing subsequent processing requirements of a particular received protocol data unit by generating at least one associated directive for the particular protocol data unit, each preprocessor being optimized to perform the processing necessary for generating the at least one associated directive for a particular type of protocol data unit;

(b) synchronizing means, operatively coupled to the preprocessors such that the first and second preprocessor are connected in parallel, for synchronizing the particular protocol data unit with the at least one associated directive for the particular protocol data unit to generate a synchronized protocol data unit;

(c) restructuring means, operatively coupled to the synchronizing means, for restructuring the synchronized protocol data unit in accordance with the at least one associated directive for the protocol data unit to generate a restructured protocol data unit; and (d) presenting means, operatively coupled to the restructuring means, for providing the restructured protocol data unit to a transmitting mechanism.

25. The protocol data unit processing device of claim 24 wherein the first preprocessor is optimized to perform the processing necessary for generating the at least one associated directive for a particular type of protocol data unit selected from the group consisting of a particular physical layer media type, a particular link layer signaling protocol, and a particular network layer protocol.

26. The protocol data unit processing device of claim 24 wherein:

(a) each preprocessor comprises means for operating on a first and a second protocol data units such that each preprocessor can interleave processing of both the first and the second protocol data units during a single time span; and (b) the synchronizing means comprises means for synchronizing both the first and the second protocol data units with the at least one associated directive for that particular protocol data unit.

27. The protocol data unit processing device of claim 24 wherein the restructuring means operates on the synchronized protocol data unit prior to the protocol data unit processing device receiving all of the protocol data unit.

28. The protocol data unit processing device of claim 24 further comprising the receiving mechanism, operatively coupled to the first and the second preprocessor means, which receives the particular protocol data unit from the communication network, the communication network being selected from the group consisting of a local protocol data unit source device, a local area network, a wide area network, a metropolitan area network, and a wireless network.

29. The protocol data unit processing device of claim 24 further comprising the transmitting mechanism, operatively coupled to the presenting means, which transmits the reconstructed protocol data unit over the communication network, the communication network being selected from the group consisting of a local protocol data unit source device, a local area network, a wide area network, a metropolitan area network, and a wireless network.

30. A method for utilizing a protocol data unit processing device in a heterogeneous communication network to transfer protocol data units within the communication network, the method comprising the steps of:

(a) receiving a first and a second protocol data unit from the communication network, the first and the second protocol data unit being of different types;

(b) establishing subsequent processing requirements of the first and the second protocol data unit to generate at least one associated directive for each protocol data unit;

(c) synchronizing each protocol data unit with the at least one associated directive for each protocol data unit to generate a first and a second synchronized protocol data unit, respectively;

(d) restructuring each synchronized protocol data unit in accordance with the at least one associated directive for each protocol data unit to generate a first and a second restructured protocol data unit, respectively; and (e) providing the first and the second restructured protocol data unit to other components in the communication network.

31. The method of claim 30 wherein the first and the second protocol data unit differ from one another by being selected from the group consisting of different physical layer media types, different link layer signaling protocols, and different network layer protocols.

* * * * *